Figure 1:
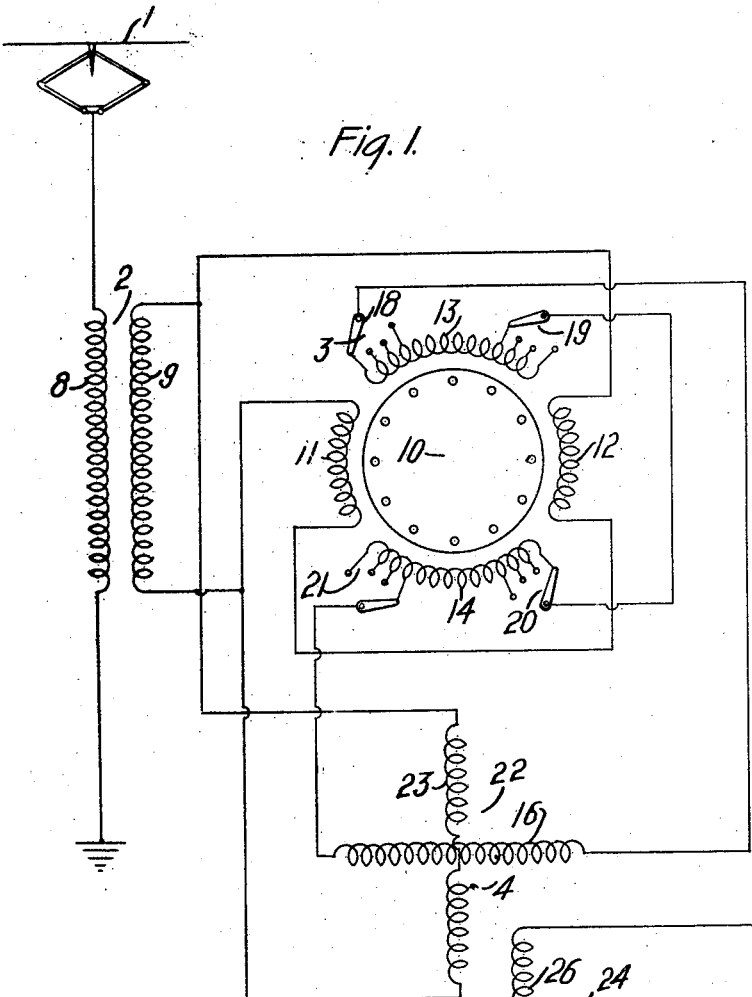

R. E. HELLMUND.
SYSTEM OF DISTRIBUTION AND CONTROL.
APPLICATION FILED FEB. 19, 1914.

1,264,298. Patented Apr. 30, 1918.

WITNESSES:
INVENTOR

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL.

1,264,298.  Specification of Letters Patent.  Patented Apr. 30, 1918.

Application filed February 19, 1914. Serial No. 819,737.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Distribution and Control, of which the following is a specification.

My invention relates to systems of alternating current distribution and control, and it has special reference to the control of polyphase induction motors which are adapted to receive energy from a single-phase distributing system through the agency of a phase converter.

One of the objects of my invention is to provide a system of the above indicated character in which the advantages of the construction and operation of a single-phase distributing system may be combined with those of polyphase induction motors.

Another object of my invention is to provide a phase converter for operating a polyphase induction motor from a single-phase source of energy, and means varying the voltage and phase position of the energy supplied to the driving motor in accordance with load conditions.

A further object of my invention is to provide means associated with a phase converter for compensating for the reactive and ohmic drop and the phase displacement of the secondary converter voltage under load conditions.

A still further object of my invention is to provide a phase converter having a plurality of separate and independent windings of different numbers of turns, and to provide means for varying the relative number of turns and the location of one of the windings for adjusting the amount and phase position of the delivered voltage.

When phase converters are employed, they usually embody a plurality of separate and like windings which are disposed in electromagnetic quadrature relationship, whereby a voltage at substantially 90° to the source of energy, is induced in the secondary winding when the primary winding is suitably excited, in accordance with well known principles. However, in such classes of apparatus, when a load is thrown on the converter, there is a material reduction in the delivered voltage by reason of the reactive and ohmic drop, and, moreover, a considerable phase distortion is effected.

According to my invention, I propose to overcome these undesirable results and to provide the phase converter secondary winding with a larger number of turns than the primary exciting winding, and, also to make provision for adjusting the number of turns thereof. Moreover, the adjusting means referred to, are so located with respect to the secondary winding that the location of the active turns thereof may actually be shifted forward or backward as desired. Thus, the voltage drop and the phase distortion of the secondary energy, under load conditions, may be compensated for with facility.

Figure 2:
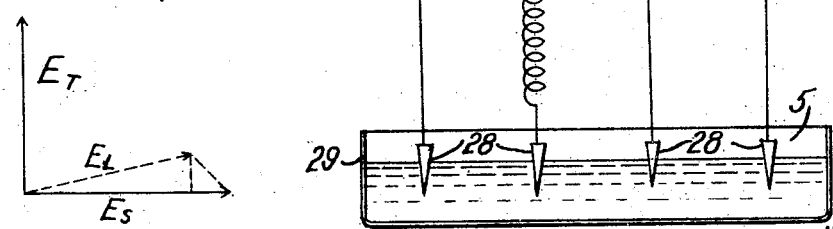

In the accompanying drawing, Figure 1 is a diagrammatic view of a system of distribution and control embodying my invention, and Fig. 2 is a vector diagram showing the relationship of certain of the phase converter voltages under predetermined conditions.

Referring to the drawing, the system shown comprises a single-phase supply circuit or source of energy 1, a transforming device 2, a phase converter 3, a polyphase induction motor 4 and a liquid rheostat 5.

The supply circuit 1 may constitute a trolley conductor which is adapted to supply alternating-current energy to a primary winding 8 of the transforming device 2 which is provided with a secondary winding 9 having suitable connections to the phase converter 3 and the polyphase induction motor 4, as hereinafter set forth.

The phase converter 3 preferably comprises a dynamo-electric machine of the induction motor type having a squirrel cage rotor 10 although it may be of wound rotor type. A plurality of windings 11, 12, 13 and 14 are associated with the stationary portion of the machine, and, the windings 11 and 12 are oppositely disposed and connected together across the secondary winding 9 of the transformer 2 and are thus excited in phase with the transformer voltage. The windings 11 and 12 constitute the primary or exciting windings of the converter.

The windings 13 and 14 constitute the secondary converter windings and are oppositely disposed and in quadrature to the primary windings 11 and 12, being electro-magnetically related thereto, although otherwise separate and independent therefrom. The windings 13 and 14 are connected in series across one of the windings 16 of the induction motor 4 and are respectively provided with switching devices 18 and 19, and 20 and 21 which are located at the respective ends thereof for the purpose of adjusting the number of turns and the position of the active turns of said windings. The windings 13 and 14 are diagrammatically shown and, in the actual construction, may assume any one of a variety of forms, such, for example, as a portion of one of the stator windings shown in U. S. Patent 1,170,657, issued to the Westinghouse Electric & Manufacturing Company, February 8, 1916, on an application filed by F. W. Meyer. The essential feature of said windings is that they be of the distributed type so that by adding active turns at one end thereof and eliminating active turns in the other end thereof, the axes of activity of the field produced thereby may be shifted and by simultaneously increasing or decreasing the number of active turns at each end of the winding, the magnitude of the field produced thereby may be altered. A larger number of turns is provided upon the secondary windings 13 and 14 than upon the primary windings 11 and 12 for the purpose already mentioned. The converter may be started and brought up to speed in any desired manner.

The induction motor 4 comprises a set 22 of primary windings 16 and 23 and a set 24 of secondary windings 25 and 26. One of the primary windings 16 is supplied with energy by the phase converter 3, as hereinbefore set forth, and said energy will, therefore, be substantially in quadrature with the energy of the transformer 2, which is adapted to deliver energy to the other primary winding 23 of the motor 4.

The secondary windings 25 and 26 of the motor 4 are connected to a plurality of electrodes 28 which are suspended within a tank 29 having suitable inlet and outlet valves (not shown) for the admission and discharge of an electrolyte. The tank 29 and its electrodes 28 constitute an adjustable liquid rheostat and are included in the circuits of the secondary windings 25 and 26 of the induction motor for the purpose of controlling the speed of the motor.

Under no-load conditions, the relationship of the transformer voltage and the voltage of the phase converter secondary windings 13 and 14 is indicated by lines $E_T$ and $E_S$ in the vector diagram shown in Fig. 2. The voltages supplied to the several phase windings of the induction motor 4 are, therefore, equal and at 90° to each other. However, as load is placed upon the motor 4, there is a reduction of voltage and a phase distortion thereof in the converter secondary windings, and the voltage delivered to the induction motor winding 16 is then indicated by line $E_L$. Under these conditions, there is an unbalanced condition of operation which is undesirable.

In order to compensate for unbalanced load conditions, the switching devices 18, 19, 20 and 21 may be adjusted to increase the number of active turns of the secondary converter windings 13 and 14 in order to raise the delivered voltage to the desired amount, while the displacement of phase position may be compensated for by suitable adjustments of said switching devices in one direction or the other, according to conditions, whereby the location of the active turns of the windings 13 and 14 may actually be shifted with respect to the primary exciting windings 11 and 12.

Having thus increased the converter secondary voltage and corrected for its phase displacement, balanced load conditions are obtained and satisfactory operation may be secured. It is evident that any load conditions may be compensated for in the manner hereinbefore described.

Althought I have set forth my invention, for illustrative purposes, in connection with a phase converter and motor of the two phase type, it is equally applicable to three phase machines of suitable design. Moreover, other means for accomplishing the same results may be employed, and I do not wish to be restricted to the specific connections and arrangements of parts set forth, and desire that only such limitations shall be imposed as are indicated in the appended claims.

I claim as my invention:

1. In a phase-converter of the dynamo-electric type, the combination with a primary winding, of a tertiary winding, one of said windings being of the progressive distributed type and split into two portions, a circuit connected to the respective portions of said distributed winding, an additional circuit joining the two portions thereof, and means for independently adjusting the points of attachment of said circuits to said winding.

2. In a phase-converter of the dynamo-electric type, the combination with primary and secondary windings, of a tertiary winding of the progressive distributed type, a load circuit, connections from said tertiary winding to said load circuit, means for adjusting the points of attachment of said load circuit to said tertiary winding, and means for eliminating a portion of the turns of said tertiary winding intermediate the points of attachment of said load circuit thereto, said last named means being adjustable so that both the number and the position of said eliminated turns may be varied.

3. In a phase-converter of the dynamo-electric type, the combination with primary and secondary windings, of a tertiary winding of the progressive distributed type divided into two portions, means for connecting a point adjacent a terminal of one of said portions to a point adjacent a terminal of the other of said portions, said points of connection each being adjustable, a load circuit, and means for connecting said load circuit to points adjacent the remaining terminals of said tertiary winding, respectively, said last-named points of connection also being adjustable.

4. In a phase-converter, the combination with primary and secondary windings, of an even number of progressively distributed tertiary windings disposed thereon to produce spaced tertiary poles, a load circuit, connections from said load circuit to terminals of certain of said tertiary windings, respectively, and interconnections between the remaining terminals of said tertiary windings respectively, all of said terminals being adjustable, whereby the phase and magnitude of the induced tertiary voltage may be varied.

In testimony whereof, I have hereunto subscribed my name this 14th day of Feb. 1914.

RUDOLF E. HELLMUND.

Witnesses:
B. B. HINES,
M. C. MERZ.

Copies of this patent may be obtained for five cents each, by addressing the "Commissioner of Patents, Washington, D. C."